(12) United States Patent
Hill (10) Patent No.: US 7,559,345 B2
(45) Date of Patent: Jul. 14, 2009

(54) INFLATABLE CURTAIN WITH VARIABLE SEAM PATTERN

(75) Inventor: Bruce R. Hill, Bloomfield Hills, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 497 days.

(21) Appl. No.: 11/010,963

(22) Filed: Dec. 13, 2004

(65) Prior Publication Data

US 2006/0128244 A1    Jun. 15, 2006

(51) Int. Cl.
*D03D 23/00* (2006.01)

(52) U.S. Cl. ............... 139/383 R; 139/384 R; 280/728.1; 442/181

(58) Field of Classification Search ........... 139/383 R, 139/384 R; 442/181; 280/728.1
See application file for complete search history.

(56) References Cited

U.S. PATENT DOCUMENTS

| | | | |
|---|---|---|---|
| 4,668,545 A * | 5/1987 | Lowe | 428/35.1 |
| 5,011,183 A * | 4/1991 | Thornton et al. | 280/743.1 |
| 6,012,738 A | 1/2000 | Beisswenger | |
| 6,135,488 A | 10/2000 | Bosio et al. | |
| 6,220,309 B1 * | 4/2001 | Sollars, Jr. | 139/389 |
| 6,429,155 B1 | 8/2002 | Li et al. | |
| 6,451,715 B2 * | 9/2002 | Li et al. | 442/76 |
| 6,488,311 B2 * | 12/2002 | Kato et al. | 280/743.1 |
| 6,607,797 B1 | 8/2003 | Ritter | |
| 6,734,125 B2 * | 5/2004 | Veiga | 442/203 |
| 6,748,980 B2 * | 6/2004 | Matsui et al. | 139/384 R |
| 6,978,808 B2 * | 12/2005 | Walsh et al. | 139/11 |
| 7,069,961 B2 * | 7/2006 | Sollars, Jr. | 139/389 |
| 2005/0130520 A1 * | 6/2005 | Mouri et al. | 442/59 |
| 2006/0249933 A1 * | 11/2006 | Sollars, Jr. | 280/729 |

* cited by examiner

*Primary Examiner*—Arti Singh-Pandey
(74) *Attorney, Agent, or Firm*—Tarolli, Sundheim, Covell & Tummino LLP (57) ABSTRACT

An inflatable vehicle occupant protection device (14) for helping to protect an occupant of a vehicle (12) includes strands of material woven together to form both (a) overlying woven panels (40 and 42) and (b) single layer first and second woven seams (120 and 150) that include strands of material from each of the overlying panels. The first and second seams (120 and 150) help define an inflatable volume (60) of the inflatable vehicle occupant protection device (14) between the overlying panels (40 and 42). The first seam (120) has a weave pattern different than the weave pattern of the second seam (150).

25 Claims, 6 Drawing Sheets

INFLATABLE CURTAIN WITH VARIABLE SEAM PATTERN

FIELD OF THE INVENTION

The present invention relates to an inflatable vehicle occupant protection device for helping to protect an occupant of a vehicle.

BACKGROUND OF THE INVENTION

It is known to inflate an inflatable vehicle occupant protection device to help protect a vehicle occupant in the event of a vehicle collision. Examples of inflatable vehicle occupant protection devices include driver and passenger side frontal impact air bags, side impact air bags, and inflatable knee bolsters. Another particular type of inflatable vehicle occupant protection device is an inflatable curtain.

The inflatable curtain is inflatable in response to the occurrence of an event for which inflation of the inflatable curtain is desired, such as a side impact to the vehicle, a vehicle rollover, or both. The inflatable curtain inflates away from a roof of the vehicle between a side structure of the vehicle and a vehicle occupant. A known inflatable curtain is inflated by inflation fluid directed from an inflator to the inflatable curtain via a fill tube.

Inflatable curtains may have a variety of constructions. One particular construction for an inflatable curtain construction is a one piece woven construction. An inflatable curtain having a one piece woven construction includes yarns that are woven to form both (a) overlying woven panels and (b) single layer portions that act as seams to define an inflatable volume of the curtain. The weave density at the seams is typically increased over that of the individual panels because the seams include the yarns of both panels. An inflatable curtain may experience higher stress levels along certain areas of the seams depending on certain factors, such as the location of the seams on the inflatable curtain.

SUMMARY OF THE INVENTION

The present invention relates to an inflatable vehicle occupant protection device that includes strands of material woven together to form both (a) overlying woven panels and (b) single layer first and second woven seams that include strands of material from each of the overlying panels. The first and second seams help define an inflatable volume of the protection device between the overlying panels. The first and second seams have different weave patterns.

The present invention also relates to an inflatable vehicle occupant protection device that includes strands of material woven together to form both (a) overlying woven panels and (b) single layer seams that include strands of material from each of the overlying panels and that help define an inflatable volume of the protection device between the overlying panels. The single layer seams include at least one high stress seam that has portions with four or more floats adjacent the inflatable volume of the protection device. The single layer seams also include at least one low permeability seam that has portions with three or less floats adjacent the inflatable volume of the protection device.

The present invention further relates to an inflatable vehicle occupant protection device that includes strands of material woven together to form both (a) overlying woven panels and (b) single layer seams that include strands of material from each of the overlying panels and that help define an inflatable volume of the protection device. The single layer seams include a high float seam positioned in an area of the protection device that undergoes high stresses. The single layer seams also include a low float seam positioned in an area of the protection device that undergoes stresses lower than those undergone by said high float seam.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
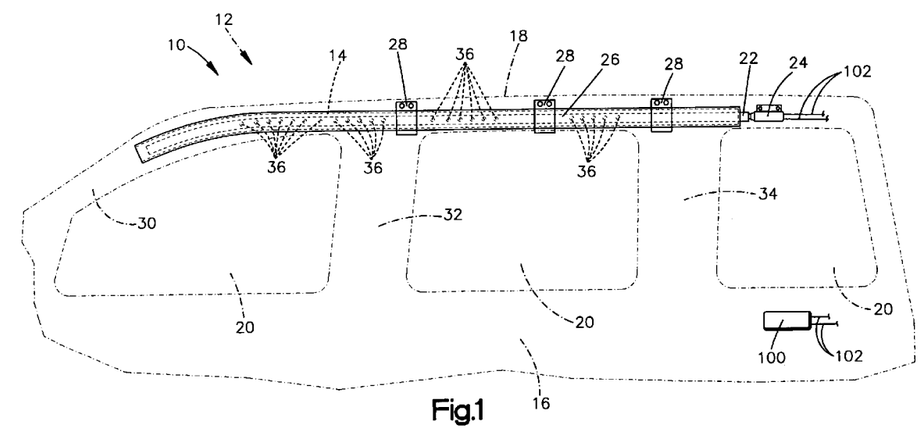
FIG. 1 is a schematic view of an apparatus for helping to protect an occupant of a vehicle, illustrating the apparatus in a deflated condition, according to the present invention.
Figure 2:
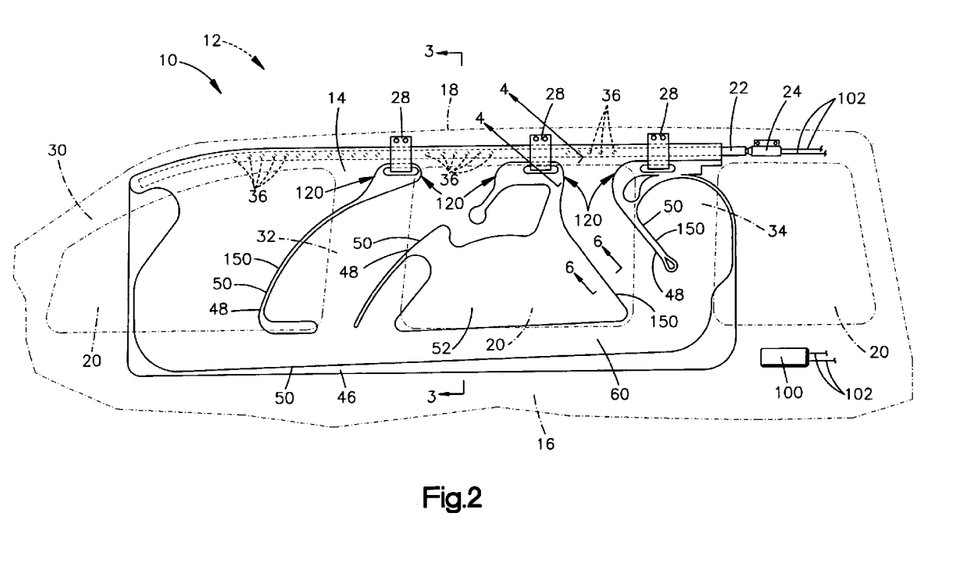
FIG. 2 is a schematic view of the apparatus of FIG. 1 in an inflated condition.

An apparatus 10 helps to protect an occupant of a vehicle 12. As shown in FIGS. 1 and 2, the apparatus 10 includes an inflatable vehicle occupant protection device in the form of an inflatable curtain 14. The present invention may include an inflatable vehicle occupant protection device in an alternative form, such as a driver side frontal impact air bag, passenger side frontal impact air bag, side impact air bag, and inflatable knee bolster.

The inflatable curtain 14 is mounted adjacent a side structure 16 of the vehicle 12 and a roof 18 of the vehicle. The side structure 16 of the vehicle 12 includes side windows 20, an A pillar 30, a B pillar 32, and a C pillar 34. An inflator 24 is connected in fluid communication with the inflatable curtain 14 through a fill tube 22.

The fill tube 22 has a first end portion for receiving fluid from the inflator 24. The fill tube 22 may be connected directly to the inflator 24 or a manifold (not shown) may connect the fill tube to the inflator. The fill tube 22 has a second end portion disposed in the inflatable curtain 14. The fill tube 22 includes openings 36 through which inflation fluid is directed into inflatable curtain 14. The fill tube 22 may be constructed of any suitable material, such as plastic, metal or fabric. As a further alternative, those skilled in the art will appreciate that the fill tube 22 may be omitted, in which case the inflator 24 may be connected directly to the inflatable curtain 14.

The inflator 24 contains a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14 and the housing 26 have an elongated configuration and extend along the vehicle roof 18 and along the side structure 16 of the vehicle 12 above the side windows 20. The fill tube 22, inflatable curtain 14 and housing 26 are connected to the vehicle 12 by means such as brackets 28.

Figure 3:
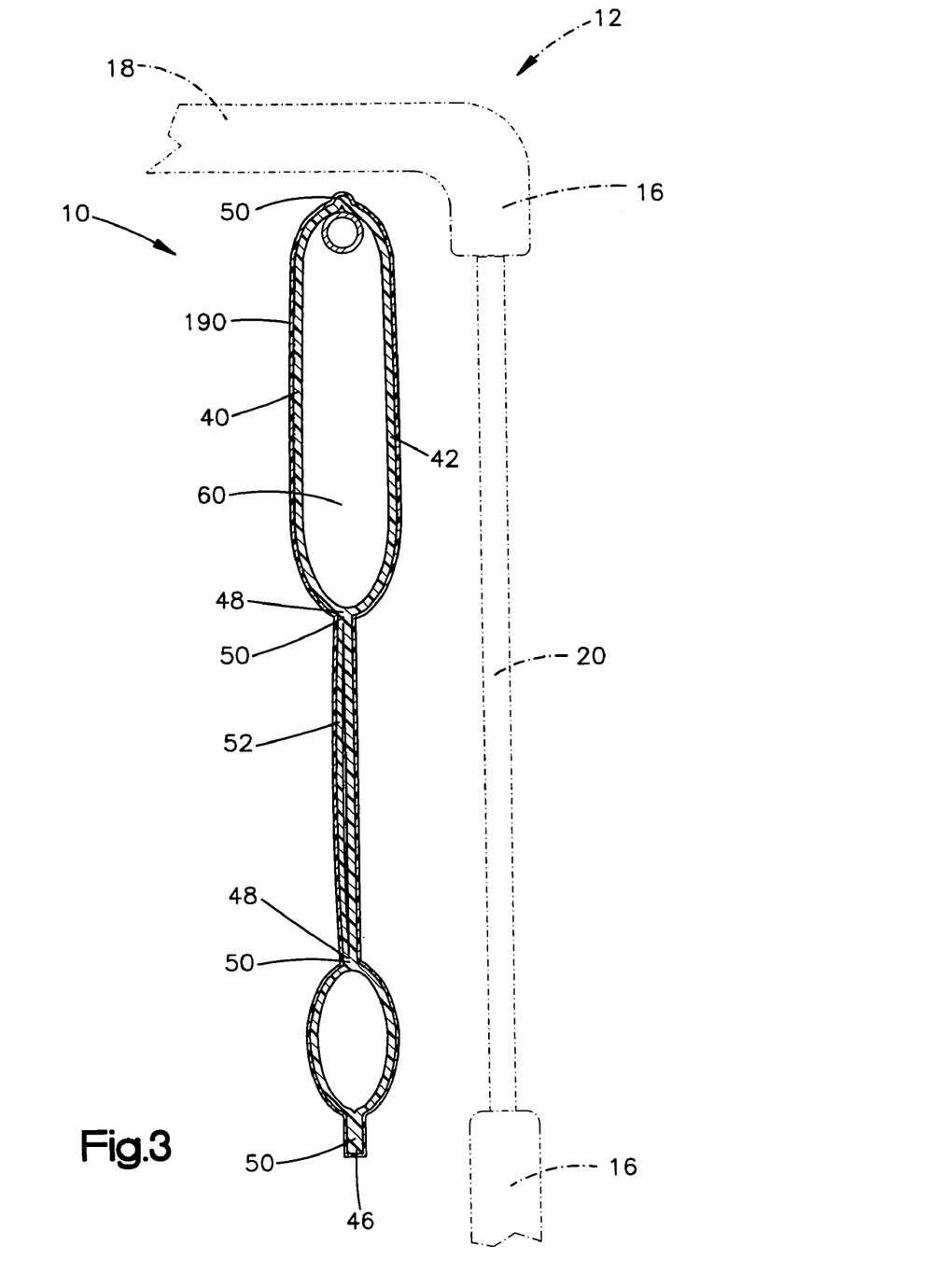
FIG. 3 is a sectional view of the apparatus taken generally along line 3-3 in FIG. 2.

Referring to FIG. 3, the inflatable curtain 14 comprises first and second panels 40 and 42 that can be spaced apart from one another and that are arranged in an overlying manner. The inflatable curtain 14 also includes seams 50 that are single layers of material, as explained below. The seams 50 include a perimeter seam 46 that extends along at least a portion of a perimeter 44 (FIGS. 2 and 3) of the inflatable curtain 14. The seams 50 may also include interior seams 48 within the perimeter 44.

The seams 50 help define an inflatable volume 60 of the inflatable curtain 14. The seams 50 may also help define inflatable chambers within the inflatable volume 60. The interior seams 48 may also form non-inflatable portions of the inflatable curtain 14 positioned within the inflatable volume 60. For example, in the embodiment illustrated in FIG. 2, the interior seams 48 help define a non-inflatable portion 52 of the inflatable curtain 14.

The vehicle 12 includes a sensor (shown schematically at 100 in FIGS. 1 and 2) for sensing the occurrence of an event for which inflation of the inflatable curtain 14 is desired, such as a side impact, a vehicle rollover, or both. Upon sensing the event, the sensor 100 provides an electrical signal over lead wires 102 to the inflator 24. The electrical signal causes the inflator 24 to be actuated in a known manner. The inflator 24 discharges fluid under pressure through fill tube 22, which directs the fluid into the inflatable curtain 14.

The inflatable curtain 14 inflates under the pressure of the inflation fluid from the inflator 24. The housing 26 (FIG. 1) opens, and the inflatable curtain 14 inflates away from the roof 18 in a downward direction as shown in the drawings and in a downward direction with respect to the direction of forward vehicle travel into the position illustrated in FIGS. 2 and 3. The inflatable curtain 14, when inflated, is positioned between the side structure 16 of the vehicle 12 and any occupant of the vehicle. When the inflatable curtain 14 is in the position illustrated in FIGS. 2 and 3, the second panel 42 (FIG. 3) is in an outboard position, adjacent the side structure 16 of the vehicle 12 between the first panel 40 and the side structure.

The inflatable curtain 14, when inflated, helps to protect a vehicle occupant in the event of a vehicle rollover or a side impact to the vehicle 12. The inflatable curtain 14, when inflated, helps to absorb the energy of impacts with the curtain and helps to distribute the impact energy over a large area of the curtain.

According to the present invention, the inflatable curtain 14 has a one piece woven construction. The one piece woven construction of the inflatable curtain 14 may be achieved using known weaving processes on known weaving machines, such as a Jacquard loom or Dobby loom. A variety of materials can be used to weave the inflatable curtain 14, such as nylon yarns (e.g., nylon 6-6) or polyester yarns. According to the one piece woven construction, strands of material are woven together to form simultaneously both the first and second panels 40 and 42, which can be spaced apart from one another, and the seams 50. The seams 50 include, in a single layer, the same strands of material that are woven to form the first and second panels.

Figure 4:
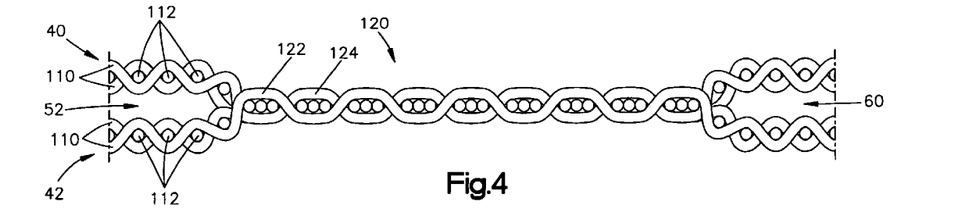
FIG. 4 is a magnified sectional view of a portion of the apparatus taken generally along line 4-4 in FIG. 2.
Figure 6:
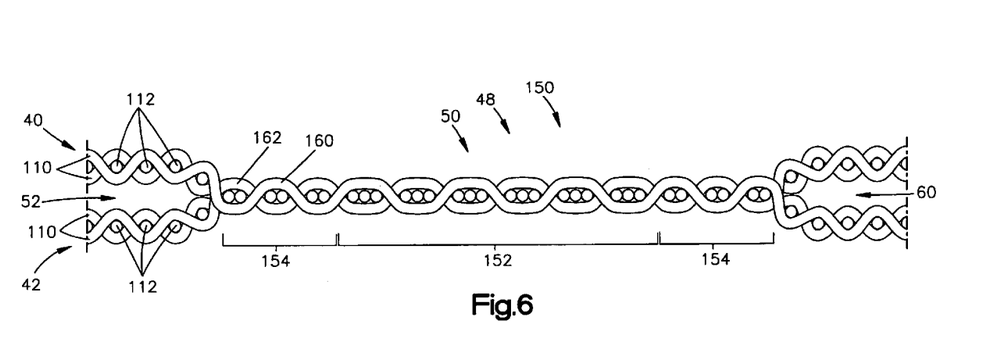
FIG. 6 is a magnified sectional view of a portion of the apparatus taken generally along line 6-6 in FIG. 2.

Referring to FIGS. 4 and 6, the first and second panels 40 and 42 each include a plurality of warp yarns, or "ends", indicated at 110. The first and second panels 40 and 42 also each include a plurality of weft yarns, or "picks," indicated at 112. The warp yarns 110 and the weft yarns 112 are oriented perpendicular to each other.

The warp yarns 110 are interlaced with the weft yarns 112 in an alternating or "up and down" fashion. In areas of the inflatable curtain 14 other than the seams 50, the first and second panels 40 and 42 are woven in a one-by-one (1×1) weave pattern referred to in the art as a "plain weave" pattern. In this plain weave pattern of the panels 40 and 42, single warp yarns 110 are interlaced around single weft yarns 112 as shown in FIGS. 4 and 6.

In this description of the present invention, the weave density of the panels 40 and 42 and the seams 50 is expressed in picks per centimeter (picks/cm), ends per centimeter (ends/cm), or both. Those skilled in the art, however, will appreciate that alternative units may be used to quantify weave density (e.g., picks/inch, ends/inch).

Also, in this description of the present invention, the term "width" of a seam 50, or of portions of a seam, refers to the number of warp yarns (ends) 112 or weft yarns (picks) 114 included in the seam, depending on the orientation of the seam with respect to the weave of the curtain fabric. For example, if a seam 50 is described as having a width of twelve yarns, it is meant that the seam includes twelve ends 112 or twelve picks 114, depending on the orientation of the seam with respect to the warp and weft directions in the curtain fabric.

According to the present invention, the inflatable curtain 14 includes seams 50 that have constructions that vary in order to provide a desired function for the particular seam. The inflatable curtain 14 includes high stress seams 120 constructed to withstand relatively high stresses during inflation and deployment of the curtain. The inflatable curtain 14 also includes low permeability seams 150 constructed to help block leakage of inflation fluid from the curtain when inflated.

Figure 5:
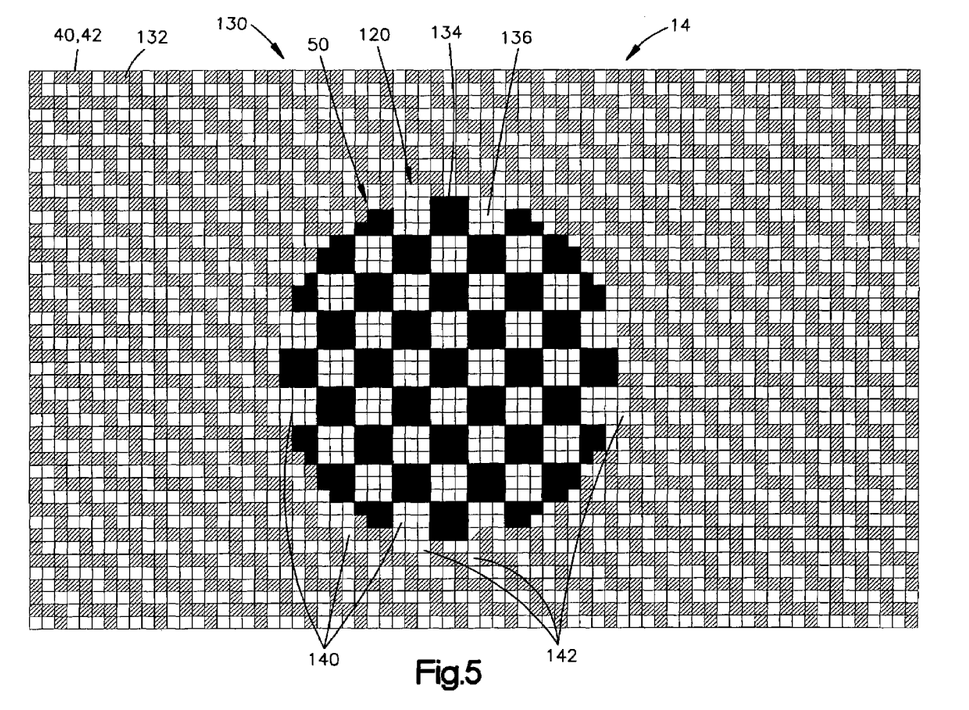
FIG. 5 is a weave diagram for the portion of the apparatus of FIG. 4.

An example of a high stress seam 120 is illustrated in FIGS. 4 and 5. The high stress seam 120 is woven in a three-by-three (3×3) basket weave and has a width of 27 ends. As known in the art, in a three-by-three basket weave, the warp yarns 110 and weft yarns 112 are interlaced in groups of three. Referring to FIG. 4, in this weave pattern, the warp yarn 110 identified at 122 is one of a first group of three warp yarns, and the warp yarn identified at 124 is one of a second group of three warp yarns. As shown in FIG. 4, the yarns 122 and 124 and their respective groups are interlaced alternately over and under groups of three weft yarns 112. The adjacent groups of warp yarns 110 are interlaced on opposite sides of each group of weft yarns 112.

A weave pattern 130 of a portion of the inflatable curtain 14 including the high stress seam 120 is illustrated in the weave diagram of FIG. 5. The generally circular configuration of the high stress seam 120 shown in FIG. 5 is for purposes of illustration. It will be appreciated that the high stress seam 120 may have any desired configuration, such as a linear or curved configuration.

Referring to FIG. 5, plain weave portions of the weave pattern 130, i.e., the plain weave construction of the panels 40 and 42, are illustrated in the shaded blocks indicated at 132. The three-by-three basket weave portions of the weave pattern, i.e., the basket weave construction of the high stress seam 120, are illustrated in the shaded blocks indicated at 134. The empty blocks illustrated at 136 represent "floats" in the weave pattern 130, i.e., floats in the panels 40 and 42, in the high stress seam 120, or both.

A float 136, as known in the art, refers to the number of adjacent warp yarns 110 or a weft yarns 112 that a weft yarn or warp yarn, respectively, extends over or under. The number of floats in a woven fabric varies with the particular type of weave with which the fabric is woven. For example, a plain woven fabric includes single floats because the warp and weft yarns pass over and under single weft and warp yarns, respectively. As another example, a three-by-three basket woven fabric includes three floats because the warp yarns and weft yarns pass over and under three adjacent weft and warp yarns, respectively.

In areas of a fabric where different weave patterns interface with each other, floats in addition to those normally occurring in the weave patterns may occur. The number and location of these excess floats is determined by the weave pattern of the fabric at the interface. While the existence of excess floats at the interface may be unavoidable, the weave pattern may be configured, to a large extent, to help place a desired number of floats in a desired location at the interface between the weave patterns.

According to the present invention, the weave pattern 130 is configured to provide more than three floats in the high stress seam 120 at the interface between the seam and the inflatable volume 60 of the curtain 14. As shown in FIG. 5, at the interface between the plain weave of the panels 40 and 42 of the inflatable volume 60 and the high stress seam 120, there are areas of four or more floats 136 in the weave pattern 130. For example, areas of four floats 136 are indicated at 140 and areas of six floats are indicated at 142.

The high stress seams 120 are intended to be located in areas or regions of the inflatable curtain 14 where the seams may experience high stresses relative to seams in other regions of the curtain. These areas may, for example, be those that may experience relatively high stresses during deployment of the inflatable curtain 14. For example, referring to FIG. 2, during inflation and deployment of the inflatable curtain 14, the seams 50 or portions of seams within a certain proximity of the outlet openings 36 in the fill tube 22 may experience relatively high stresses. These stresses may, for example, be heightened in areas where the outlet openings 36 direct inflation fluid at or against a seam 50 positioned relatively close to the openings. As shown in FIG. 2, the high stress seams 120 are positioned in these areas.

The increased floats 136 in the weave pattern 130 provided by the configuration of the high stress seam 120 help prevent the occurrence of tears in the inflatable curtain 14 that may result from high stresses. The floats 136 in the weave pattern 130 permit the yarns of the high stress seam 120 and at the interface between the high stress seam and the plain woven panels 40 and 42 to shift relative to each other. The yarns of the high stress seams 120 may shift in order to absorb or dissipate stresses, such as those associated with deployment of the inflatable curtain 14, which helps prevent the curtain fabric from tearing. The construction of the high stress seam 120 thus helps prevent tearing or other failure of the curtain fabric in areas of the curtain 14 that may experience high stress.

It will be appreciated that the high float (four or more) weave pattern 130 resulting from the construction of the high stress seam 120 also increases the gas permeability of the inflatable curtain 14 in the area of the floats 136. This may be at least partially due to the relatively large openings or gaps resulting from the shifting yarns. This may also be due to the fact that the three-by-three basket weave of the high stress seam 120 is a relatively loose weave in comparison to, for example, a two-by-two basket weave or a plain weave.

According to the present invention, the inflatable curtain 14 also includes the low permeability seams 150 in areas or regions of the curtain where the seams may experience relatively low or lower stresses compared to the stresses experienced at the high stress seams 120. The high stress seams 120 and low permeability seams 150 may be separate seams 50 of the inflatable curtain 14. The high stress seams 120 and low permeability seams 150 may also be separate portions in respective high stress and low stress areas of a single seam 50.

Figure 7:
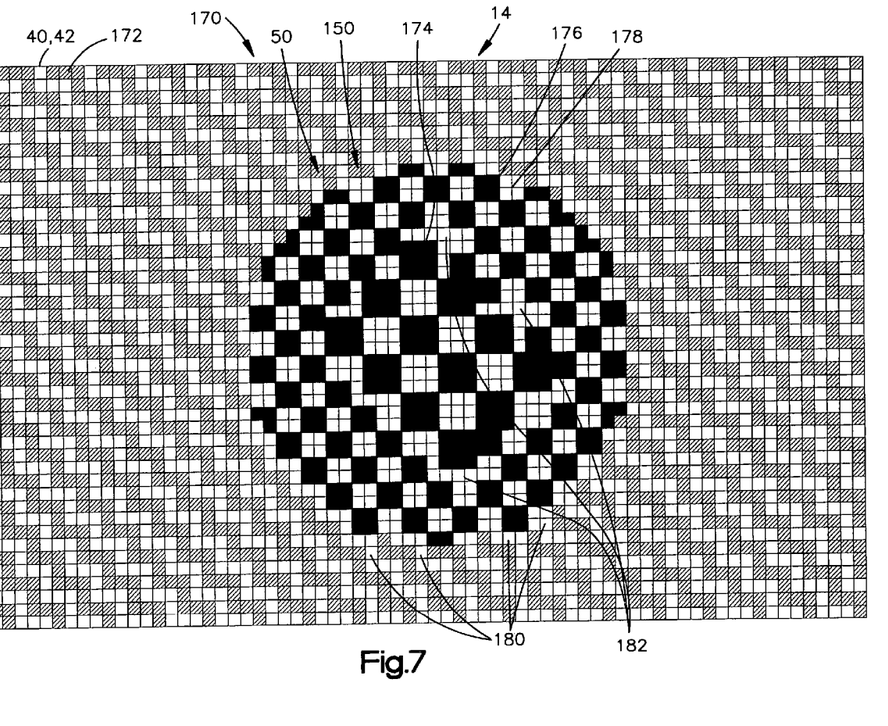
FIG. 7 is a weave diagram for the portion of the apparatus of FIG. 6.

An example of a low permeability seam 150 is illustrated in FIGS. 6 and 7. The low permeability seam 150 has a first portion 152 woven in a three-by-three (3×3) basket weave and has a width of 18 ends. The yarns 110 and 112 in the first portion 152 of the low permeability seam 150 are woven in the three-by-three basket weave in a manner similar or identical to that described above in regard to the high stress seam 120.

The low permeability seam 150 also has second portions 154 woven in a two-by-two (2×2) basket weave with a width of six ends. The second portions 154 of the low permeability seam 150 are positioned on opposite ends of the low permeability seam. In the embodiment illustrated in FIG. 6, the low permeability seam 150 is an interior seam having the inflatable volume 60 of the curtain 14 and a non-inflatable portion 52 of the curtain positioned on opposite sides of the seam. The low permeability seam 150 thus has second portions 154 positioned on both sides of the first portion 152, as shown in FIG. 6. The low permeability seam 150 could, however, have an inflatable portion of the curtain 14 on one side only of the seam. This may be the case, for example, with the seam 50 that forms the perimeter connection 46 of the curtain 14.

Referring to FIG. 6, in the second portion 154 of the seam 150, the warp yarn 110 identified at 160 is one of a first group of two warp yarns and the warp yarn identified at 162 is one of a second group of two warp yarns. As shown in FIG. 6, in the second portion 154, the yarns 160 and 162 and their respective groups are interlaced alternately over and under groups of two weft yarns 112. The adjacent groups of warp yarns 110 are interlaced on opposite sides of each group of weft yarns 112. In the first portion 152, the yarns 160 and 162 become arranged in groups of three to form the 3×3 basket weave pattern of the first portion.

A weave pattern 170 of a portion of the inflatable curtain 14 including the low permeability seam 150 is illustrated in the weave diagram of FIG. 7. The generally circular configuration of the low permeability seam 150 shown in FIG. 7 is for purposes of illustration. It will be appreciated that the low permeability seam 150 may have any desired configuration.

Referring to FIG. 7, plain weave portions of the weave pattern 170, i.e., the plain weave construction of the panels 40 and 42, are illustrated by the shaded blocks indicated at 172. The first portion 152 of the low permeability seam 150, i.e., the three-by-three basket weave portion of the seam, is illustrated by the larger shaded blocks indicated at 174 of the weave pattern 170. The second portion 154 of the low permeability seam 150, i.e., the two-by-two basket weave portion of the seam, is illustrated by the smaller shaded blocks indicated at 176 of the weave pattern 170. The empty blocks indicated at 178 represent floats in the weave pattern 170, i.e., floats in the panels 40 and 42, in the low permeability seam 150, or both.

According to the present invention, the weave pattern 170 is configured to help reduce the number of floats in the low permeability seam 150 at the interface between the seam and the inflatable volume 60 of the curtain 14. As shown in FIG. 7, at the interface between the plain weave of the panels 40 and 42 of the inflatable volume 60 and the two-by-two basket weave of the second portion 154, there are three or fewer floats 178 in the weave pattern 170. For example, areas of three floats 178 are indicated at 180.

The low permeability seams 150 are intended to be located in areas or regions of the inflatable curtain 14 where the seams may experience low stresses relative to the high stress seams 120 of the curtain. These areas may, for example, be those spaced or isolated from the outlet openings 36 in the fill tube 22.

The reduced floats 178 in the weave pattern 130 resulting form the low permeability seam 150 help block leakage of inflation fluid through the seam. The reduced floats 178 help reduce yarn shifting and help reduce the open area or gaps in the weave pattern 130 through which inflation fluid may leak. The relatively tight construction of the two-by-two basket weave also helps block inflation fluid leakage. The low permeability seam 150 thus helps prevent inflation fluid leakage in areas of the curtain 14 that experience relatively lower stresses than those experienced by the high stress seams 120.

It will be appreciated that the construction of the low permeability seam 150 may result in more than three floats 178 in areas internal to the seam. For example, areas of six floats are indicated at 182 in FIG. 7. These floats 178, however, are isolated from the inflatable volume by the second portion 154 of the low permeability seam 150. The floats 178 internal to the low permeability seam 150 thus may have little or no effect on the gas permeability of the seam.

The combination of the high stress seams 120 and low permeability seams 150 implemented in the inflatable curtain 14 helps improve tear resistance of the curtain while lowering the overall gas permeability of the curtain. The exact locations of the high stress seams 120 and low permeability seams 150 may depend on a variety of factors, such as the configuration of the curtain 14, fill tube 22, or both. The improved, i.e., reduced, overall gas permeability of the inflatable curtain 14 facilitated by the seams 120 and 150 may also help reduce or eliminate additional sealing required for the curtain.

To help further reduce the gas permeability of the curtain 14, a coating 190 (FIG. 3) may be applied to the panels 40 and 42. The coating 190 comprises a gas impermeable material. Because of the reduced gas permeability realized through the implementation of the high stress seams 120 and low permeability seams 150, the amount or weight of the coating 190 required to provide the desired gas permeability characteristics of the curtain 14 may be lowered.

The coating 190 may comprise a urethane or silicone material. For example, the coating 190 may be polycarbonate polyurethane coating. To help prevent blocking, i.e., the tendency of abutting coated panels to stick together when the inflatable curtain 14 is rolled or folded in the stored condition, a polyether or polyester based urethane coating may be applied as an additional coating or may be mixed with the polycarbonate polyurethane. A liquid form non-halogenated flame retardant, such as Fyroflex RDP or Lindol CDP, may also be added to the coating. According to the present invention, the total weight of the coating applied to the curtain 14 is about 27 grams per square meter ($g/m^2$) or less. Preferably, the weight of the coating is less than 27 $g/m^2$.

In one particular construction, the inflatable curtain 14 may be woven with a 350 dtex nylon 6-6 yarn and may incorporate the high stress and low permeability seams 120 and 150. The coating 190 comprises a polycarbonate polyurethane and is applied with a weight of less than 27 $g/m^2$.

From the above description of the invention, those skilled in the art will perceive improvements, changes and modifications. For example, the seam constructions of the present invention are illustrated as being implemented in the construction of an inflatable curtain. The seam constructions of the present invention could, however, be applied to any inflatable vehicle occupant protection device, such as driver side frontal impact air bags, passenger side frontal impact air bags, side impact air bags, and inflatable knee bolsters. Such improvements, changes and modifications within the skill of the art are intended to be covered by the appended claims.

Having described the invention, the following is claimed:

1. An inflatable vehicle occupant protection device for helping to protect an occupant of a vehicle, said inflatable vehicle occupant protection device comprising: strands of material woven together to form both (a) overlying woven panels and (b) single layer first and second woven seams that include strands of material from each of the overlying panels, the first and second seams helping to define an inflatable volume of said inflatable vehicle occupant protection device between the overlying panels, said first seam having a weave pattern at the interface between the first seam and the inflatable volume different than the weave pattern of said second seam at the interface between the second seam and the inflatable volume, and wherein said weave pattern of said first seam has a weave density that is lower than a weave density of said weave pattern of said second seam.

2. The inflatable vehicle occupant protection device recited in claim 1, wherein said first seam is positioned at a location on the inflatable vehicle occupant protection device such that said first seam undergoes high stresses during deployment of the inflatable vehicle occupant protection device, said second seam being positioned at a location on the inflatable vehicle occupant protection device such that said second seam undergoes stresses during deployment of the inflatable vehicle occupant protection device that are lower than the stresses on the first seam.

3. The inflatable vehicle occupant protection device recited in claim 1, wherein said weave pattern of said first seam comprises four or more floats.

4. The inflatable vehicle occupant protection device recited in claim 1, wherein said weave pattern of said first seam comprises a three-by-three basket weave.

5. The inflatable vehicle occupant protection device recited in claim 4, wherein said first seam has a width of eighteen yarns.

6. The inflatable vehicle occupant protection device recited in claim 4, wherein said three-by-three basket weave of said first seam is positioned adjacent said inflatable volume of said inflatable vehicle occupant protection device.

7. The inflatable vehicle occupant protection device recited in claim 1, wherein said weave pattern of said second seam comprises three or less floats.

8. The inflatable vehicle occupant protection device recited in claim 1, wherein said weave pattern of said second seam comprises a two-by-two basket weave.

9. The inflatable vehicle occupant protection device recited in claim 8, wherein said second seam has a width of six yarns.

10. The inflatable vehicle occupant protection device recited in claim 8, wherein said second seam further comprises a three-by-three basket weave.

11. The inflatable vehicle occupant protection device recited in claim 10, wherein said two-by-two basket weave of said second seam surrounds said three-by-three basket weave of said second seam.

12. The inflatable vehicle occupant protection device recited in claim 10, wherein said two-by-two basket weave of said second seam is positioned adjacent said inflatable volume of said inflatable vehicle occupant protection device and said three-by-three basket weave of said second seam is spaced from said inflatable volume of said inflatable vehicle occupant protection device.

13. The inflatable vehicle occupant protection device recited in claim 1, wherein said overlying panels are woven in a plain weave pattern.

14. The inflatable vehicle occupant protection device recited in claim 1, further comprising one of a urethane based and silicone based coating on said overlying woven panels.

15. The inflatable vehicle occupant protection device recited in claim 14, wherein said coating comprises at least one of a polycarbonate polyurethane coating, a polyether based urethane coating, and a polyester based urethane coating.

16. The inflatable vehicle occupant protection device recited in claim 14, wherein said coating comprises liquid based flame retardant.

17. The inflatable vehicle occupant protection device recited in claim 15, wherein said coating is applied to said overlying woven panels with a weight about 27 g/m$^2$ or less.

18. An inflatable vehicle occupant protection device comprising strands of material woven together to form both (a) overlying woven panels and (b) single layer woven seams that include strands of material from each of the overlying panels and that help define an inflatable volume of the inflatable vehicle occupant protection device between the overlying panels, said single layer seams comprising:
   at least one high stress seam that creates instances of at least four or more floats adjacent the inflatable volume of said inflatable vehicle occupant protection device; and
   at least one low permeability seam that creates no more than three floats adjacent the inflatable volume of said inflatable vehicle occupant protection device.

19. The inflatable vehicle occupant protection device recited in claim 18, wherein said high stress seam comprises a three-by-three basket weave adjacent the inflatable volume of said inflatable vehicle occupant protection device.

20. The inflatable vehicle occupant protection device recited in claim 18, wherein said low permeability seam comprises a two-by-two basket weave adjacent said inflatable volume of said inflatable vehicle occupant protection device.

21. The inflatable vehicle occupant protection device recited in claim 20, wherein said low permeability seam further comprises a three-by-three basket weave spaced from said inflatable volume of said inflatable vehicle occupant protection device.

22. The inflatable vehicle occupant protection device recited in claim 18, wherein said low permeability seam comprises a three-by-three basket weave surrounded by a two-by-two basket weave.

23. The inflatable vehicle occupant protection device recited in claim 18, wherein said high stress seam is positioned in areas of the inflatable vehicle occupant protection device susceptible to high stresses during deployment of the inflatable vehicle occupant protection device.

24. The inflatable vehicle occupant protection device recited in claim 18, wherein said low permeability seam is positioned in areas of the inflatable vehicle occupant protection device that undergo stresses lower than stresses in areas of the inflatable vehicle occupant protection device where said high stress seam is positioned during deployment of the inflatable vehicle occupant protection device.

25. An inflatable vehicle occupant protection device comprising strands of material woven together to form both (a) overlying woven panels and (b) single layer woven seams that include strands of material from each of the overlying panels and that help to define an inflatable volume of the inflatable vehicle occupant protection device between the overlying panels, said single layer seams comprising:
   a high float seam positioned in an area of the inflatable vehicle occupant protection device that undergoes high stresses; and
   a low float seam positioned in an area of the inflatable vehicle occupant protection device that undergoes stresses lower than those undergone by said high float seam.

* * * * *